United States Patent [19]

Hasuly et al.

[11] 4,421,566

[45] Dec. 20, 1983

[54] WARP SIZE

[75] Inventors: Michael J. Hasuly, South Plainfield; Daniel B. Solarek, Somerville; Wadym Jarowenko, Green Brook, all of N.J.

[73] Assignee: National Starch And Chemical Corporation, Bridgewater, N.J.

[21] Appl. No.: 419,397

[22] Filed: Sep. 17, 1982

[51] Int. Cl.³ .................. C08B 31/08; D06B 3/10; D06B 3/32
[52] U.S. Cl. .................. 106/213; 28/178; 28/182; 106/212; 536/50
[58] Field of Search .............. 536/50; 28/178, 182; 106/213, 212

[56] References Cited

U.S. PATENT DOCUMENTS

| | | | |
|---|---|---|---|
| 2,813,093 | 11/1957 | Caldwell et al. | 536/50 |
| 2,876,217 | 3/1959 | Paschall | 536/50 |
| 2,946,705 | 7/1960 | Olsen | 536/50 |
| 2,995,513 | 8/1961 | Paschall et al. | 536/50 |
| 3,598,623 | 8/1971 | Powers et al. | 106/213 |
| 3,622,563 | 11/1971 | Elizer | 106/213 |
| 3,622,567 | 11/1971 | Razdan | 424/244 |
| 3,650,787 | 3/1972 | Elizer | 536/50 |
| 3,673,171 | 6/1972 | Elizer | 536/50 |
| 3,846,405 | 11/1974 | McClendon | 536/50 |

*Primary Examiner*—Ronald W. Griffin
*Attorney, Agent, or Firm*—Edwin M. Szala; Ellen T. Dec

[57] ABSTRACT

Warp sizing compositions and starches useful therefor are prepared from high amylose starches which are converted to a water fluidity viscosity within the range of 65 to 80 and then reacted with an etherification reagent to achieve a nitrogen content of 0.5 to 0.9% (dry basis).

5 Claims, No Drawings

WARP SIZE

The present invention is directed to a process for the warp sizing of textile yarns and to the improved weaving properties of the textiles thus obtained. More specifically, the invention relates to an improved process for warp sizing utilizing a warp size composition characterized by increased viscosity stability and improved sizing properties.

Warp sizing, or slashing, is the process of impregnating the yarns which run lengthwise in a woven fabric with a sizing solution or dispersion. This is then followed by removal of the excess sizing by passage of the wet yarns through a set of squeeze rolls followed by drying.

Warp sizing is carried out on a slashing machine consisting of a creel which generally holds one or more section beams. These section beams usually contain from 200-500 yarn ends. The yarn ends from several of these section beams are brought together so as to form a sheet of yarn with about 1500-8000 ends. This sheet then enters the size box wherein it is guided through the sizing solution and through one or more sets of squeeze rolls, so as to remove the surplus size which then falls back into the size box. Drying is accomplished by passing the yarn through a heated chamber or over the surface of internally heated drying cylinders.

The dried yarn is then separated by means of horizontal split rods into sections corresponding to those of the original section beams. The yarn is then almost immediately recombined by being passed through a vertical comb and thereupon onto a take-up beam referred to as a loom beam. This loom beam holds the yarn until such time as it is used in the weaving process.

One of the primary functions of the sizing process is to aid in the reduction of loom abrasion. To do this, the sizing must exert a film forming action, with the resultant film having the ability to resist the abrasive action of the various machine parts that come in contact with the yarns as well as the rubbing together of the individual yarns themselves.

Both high amylose and/or cationic starches have been proposed for use in warp sizing operations as for example in U.S. Pat. Nos. 2,946,705; 3,650,787; 3,622,563; 3,673,171; etc. When starch is used for sizing, it is necessary to cook the starch so as to form a satisfactory dispersion which will result in a smooth film on application to the web. The stability of the resultant starch dispersion has, however, become a problem particularly with respect to the tendency of the dispersion to break down or thin out as a result of being continuously maintained at elevated temperatures, often with shearing, prior to application. Since the efficiency of the size is directly related to the amount of size deposited on the yarn, this reduction in viscosity leads to poorer sizing properties with insufficient size being placed on the warp and poorer running on the loom.

We have now found that if the high amylose starch is subjected to a conversion reaction so as to obtain a starch having a water fluidity within the range of 65 to 80, the resultant starch, when treated with tertiary or quaternary cationic reagents will produce a size characterized by superior properties for warp sizing. The granular product is completely dispersible by cooking at atmospheric pressure and the resulting cooks show remarkable viscosity stability when exposed to prolonged heating and agitation. In particular, the combination of conversion and cationization allows the starch to disperse more readily upon cooking without the need for homogenization and to reach a "floor" viscosity more quickly. The "floor" viscosity is defined as the state where the starch granules are disintegrated and a complete colloidal dispersion has been obtained. At this point, it is not likely that the starch will breakdown or thin out appreciably with continued heating and/or shearing.

The finding that this combination of treatments will produce a starch useful in warp sizing compositions is unexpected in that the higher degree of conversion would be expected to degrade the starch molecule to such an extent as to produce brittle films which would tend to flake or crack and result in incomplete sizing. It is also unexpected that the dispersions formed from the starches, which dispersions are relatively thin having viscosities in the fluidity range of 65 to 80 will demonstrate superior warp sizing, weaving and rinsing properties since it was previously thought that fluidities less than about 50 would be required to ensure a sufficient pick up of the size and proper distribution of the size throughout the yarn.

The term "high amylose starch" when used herein refers to any granular starch or starch fraction containing at least about 50 percent by weight amylose. Exemplary thereof are amylose fractions such as the amylose fraction of corn starch or the amylose fraction of potato starch; "Amylomaize", Hylon V or "Amylon" (high amylose corn starch with about 54% amylose); Hylon VII or "Amylomaize VII" (high amylose corn starch containing about B 70% amylose). The starch from which the high amylose portion is obtained may be of any origin, for example, corn, wheat, potato, waxy corn, tapioca, sago or rice.

The high amylose starch to be used in the size herein is subjected to a conversion treatment using conventional acid conversion or oxidation procedures. Generally, the acid-conversion is preferred and the reaction is run at 50°-55° C. in the presence of strong mineral acids such as hydrochloric acid which is preferred in this invention. Typically 2-5% of the concentrated acid solution is added; with 3-4% concentrated hydrochloric acid and a reaction time of 10-16 hours at 50°-55° C. being sufficient to insure a product with a final WF in the 65-80, preferably 70-80 range. Higher amounts of acid can be used and reaction times will vary accordingly.

The converted high amylose starch is then reacted directly, if desired, with an etherification reagent which will serve to introduce a tertiary or quaternary amine group onto the starch molecules. This particular reagent may be selected from the group of nitrogen containing compounds consisting of alkyl imines, alkyl epoxides and allyl amino halides, as well as the corresponding compounds containing aryl groups in addition to the alkyl groups. All of the various types of reagents listed here, have the common characteristic of reacting with hydroxyl groups in the starch to introduce an ester or ether linkage, and thereby introducing an amine radical into the starch. It is to be noted that in order to facilitate processing and recovery of the starch it is necessary that the starch be converted prior to the etherification reaction.

Representative examples of specific reagents for the purpose of making the starch derivatives include ethylene imine; propylene imine; b-diethylaminoethyl chloride; b-methylaminoisopropyl chloride; b-dimethylaminoethyl chloride; 3-diethylamino-1,2-epoxypropane; 3-dibutylamino 1,2-epoxypropane; 2-bromo-5-diethylamino pentanehydrobromide; N-(2,3-epoxypropyl)-piperidine; and N,N-(2,3-epoxypropyl)methyl aniline. The various halides (e.g. chloro-, bromo-, etc.) can be used interchangeably. In the above reagents, where the free amines have been indicated (e.g. b-diethylaminoethyl chloride), one can also use the hydrochloride or other salts of these reagents (e.g. b-diethylaminoethyl chloride hydrochloride). In fact it is ordinarily preferred to use the salts since these are often less toxic and more convenient to handle. The hydrochloride moiety takes no part in the reaction. It will be seen that besides the alkyl, aryl and aralkyl types, the reagents may also include those containing cyclic groups. Therefore when reference is made to the alkyl, aryl and aralkyl groups, it will be understood that the cyclic reagents are equivalent of these types.

Methods for producing the cationic starch derivatives are known. For example, details for making tertiary amino alkyl starch ethers are set forth in U.S. Pat. No. 2,813,093 which issued on Nov. 12, 1957, and is assigned to the assignees of the subject application. Methods for preparation of similar quaternary derivatives are taught, for example, in U.S. Pat. Nos. 2,876,217 and 2,995,513.

In making the cationic starch derivatives, starch is preferably treated with any of the previously described reagents in the presence of an alkaline medium at a pH of 10 or greater. This may be accomplished by suspending the starch in water, to which has been added (either before or after the addition of the starch) sufficient base, such as alkali metal hydroxide, alkaline earth hydroxide, quaternary ammonium hydroxide, or the like, to maintain the mixture in an alkaline state during the reaction. The required amount of the amine reagent is then added, agitation being maintained until the desired reaction is complete. Heat may be applied, if desired, in order to speed the reaction, since the usual time-temperature relationship is observed. However if heat is used, temperatures of less than about 40° C. should be maintained. In some cases the alkali may be added stepwise after the addition of the amine reagent, or it may be added simultaneously with the reagent.

The proportion of etherification reagent used will vary with the particular reagent chosen (since they naturally vary in reactivity and reaction efficiency), and the degree of substitution desired. Thus, substantial improvements in warp sizing efficiency have been achieved by using a cationic starch derivative made with 7 to 30% of the reagent, based on the weight of the starch. Preferred ranges are on the order of about 8 to 14%, more preferably 10 to 12% since higher treatments may cause recovery problems and lower treatments do not stabilize the starch sufficiently.

After the cationization reaction the reaction slurry is neutralized to a pH of 3.0–5.0 and filtered. The filter cake is washed with water. The final nitrogen content is 0.5 to 0.9%, dry basis.

In practice, it has been found that cationic starch derivatives can be most effectively used as warp sizing agents when dispersed in water in amounts ranging from 3 to 50 parts of the derivative per hundred parts of water. The precise amounts of the starch employed vary depending upon the equipment, the fabric construction (i.e., the style) and the type of fiber being treated.

In addition to the starch derivatives of the invention, other conventional warp size additives such as softeners, acrylic and polyester binders, anti-stats and mildew preventatives may also be used herein in conventional amounts. In particular, the warp size compositions will generally contain softeners consisting of oleaginous materials which reduce the tendency of the starch dispersion to congeal and also act as lubricants for the sized yarns. The most commonly used softeners are hydrogenated tallow waxes, referred to as mill waxes and represented by North Wax 686 sold by North Chemical Co. of Marietta, Ga. These softeners are generally used in the formulation in amounts from about 0.5 to 10% based upon the weight of the cationic starch derivative.

The warp sizes produced herein are useful in the conventional sizing of any natural, synthetic or blended fiber as, for example, cotton, polyester, wool, nylons, rayons and glass fibers.

The following examples will illustrate the embodiments of our invention.

EXAMPLE 1

This example illustrates the general method for preparing highly converted, cationic, high amylose starches of this invention using diethylaminoethylchloride hydrogen chloride salt (referred to as DEC) for the starch cationization reaction.

Eleven hundred parts of commercially dry Hylon VII (high amylose starch) were slurried in 1650 parts water followed by 3.5% (based on 1100 parts starch) of reagent-grade, concentrated, hydrochloric acid. The temperature of the slurry was raised to 52° C. and the mixture was allowed to react with constant stirring for 16 hours. After cooling the slurry to 40° C., 12% DEC and 8% calcium hydroxide (based on amount of starch) were added to the slurry and the reaction continued at 40° C. for 6 hours. The final, cationic search ether was recovered by neutralizing the reaction mixture to 3.0 pH with concentrated hydrochloric acid followed by filtration on a Buchner funnel and washing the cake with water. The product had a nitrogen content of 0.679% dry basis and a water fluidity (WF) of 75.5.

EXAMPLE 2

This example illustrates the use of 3-chloro-2-hydroxypropyltrimethylammonium chloride as the starch cationizing reagent.

Hylon VII was acid converted similarly as in Example 1. To a 40% solids starch slurry containing 1000 parts of the acid converted starch, were added 24% of the 3-chloro-2-hydroxypropyltrimethylammonium chloride as a 50% active solids solution (12% dry basis on starch) and 7.5% $Ca(OH)_2$. The reaction was run at 40°, 16 hours and recovered as in Example 1. The product had 0.76% nitrogen (dry basis) and a WF of 75.

EXAMPLE 3

This example further illustrates the process of this invention by showing the preparation of additional cationic starch derivatives. All reactions started with a slurry consisting of 1100 parts of Hylon VII and 1650 parts water. Acid conversions were run at 52° C. for 16 hours, followed by cooling to 40° C., neutralization to 5.0 pH with 3% NaOH solution, addition of DEC and $Ca(OH)_2$ and continued reaction at 40° C. for 6 hours. The reactions were neutralized to 3.0, filtered, washed, and dried. The details are summarized in the following table:

| Sample | % HCl | % DEC | % Ca(OH)$_2$ | Final Product WF |
|---|---|---|---|---|
| A | 2.73 | 12 | 8 | 68.5 |
| B | 3.00 | 12 | 8 | 71.0 |
| C | 3.18 | 12 | 8 | 72.0 |
| D | 3.36 | 12 | 8 | 73.0 |

All the samples produced above are suitable for use in the warp size compositions disclosed herein.

EXAMPLE 4

This example represents a lab study of the viscosity stability of cationic, high amylose, fluidity starch and shows the effectiveness of high fluidity and high treatment in producing viscosity stable disperions.

Cationic starch derivatives were prepared as described in Example I with the amount of acid adjusted to give the different water fluidity values. Dispersions of the starch were made by cooking slurries in a boiling water bath at the concentrations indicated. The samples were aged in the bath over a 3 hour period. Viscosity was measured at 1 hour and 3 hours with a Stormer Viscometer (Thomas Co.) at 80° C. with % viscosity breakdown calculated as follows:

a=Stormer seconds at 1 hour
b=Stormer seconds at 3 hours
% Viscosity Breakdown=

$$\frac{a-b}{a} \times 100$$

Results are summarized in the following table:

| Sample | % DEC | % Nitrogen | WF | % Solids Of Dispersion | % Viscosity Breakdown |
|---|---|---|---|---|---|
| A | 12 | 0.864 | 80 | 25.0 | None |
| B | 10 | 0.640 | 73 | 20.0 | 3.5 |
| C | 10 | 0.610 | 76 | 20.0 | 2.4 |
| D | 5.5 | 0.420 | 40 | 13.5 | 29.3 |
| E | 8 | 0.550 | 78 | 22.5 | 15.4 |
| F | 10 | 0.660 | 78 | 22.5 | None |

As is seen for the results, sample D prepared at low levels of cationization and at a low WF exhibited an unacceptably high degree of viscosity breakdown.

EXAMPLE 5

This example illustrates the use of sodium hypochlorite in producing the high amylose fluidity base as well as the preference for highly substituted, high fluidity derivatives.

Two reaction slurries were prepared containing 500 g Hylon VII in 750 cc water. Then 300 g of an alkaline hypochlorite solution (5% active chlorine as NaOCl) was added to each slurry and reaction was continued at room temperature for 16 hours. Excess hypochlorite was destroyed by addition of sodium bisulfite. Varying amounts of DEC and calcium hydroxide were added to produce derivatives with low and high nitrogen content. The samples were tested as in Example 4. Results were as follows:

| Sample | % Nitrogen (D.B.) | WF | Viscosity Stability % Solids | Viscosity Stability % Breakdown |
|---|---|---|---|---|
| A | 0.682 | 72 | 20 | None |
| B | 0.331 | 62 | 20 | 34% |

As is seen, the viscosity breakdown for samples prepared with low nitrogen content was found unacceptable.

EXAMPLE 6

This example demonstrates the use of the product of invention in the pressure slasher on polyester-cotton blend. A starch derivative made as in Example 1 was used to size 40/2 yarns for a 65/35 polyester-cotton rainwear fabric.

A formula consisting of 500 lbs. of the starch derivative made as in Example 1 and 25 lbs. mill wax, was finished at 345 gallons. Application using a high pressure slasher at a nominal roll pressure of 50 psi resulted in a size content of 11.3%. For comparative purposes, a conventional size for this style consisting of 300 lbs. of polyvinyl alcohol, 30 lbs. acrylic binder, finished at 315 gallons, and resulting in a size content of 11.2% was also tested.

In a commercial run, the warp size composition of the present invention gave faster slasher speeds and lower drying can temperatures, resulting in significant energy savings and/or production increases. Shedding at the bust rods (i.e. lease rods) was also observed to be reduced. The reduced shedding improves loom cleanliness and results in higher quality fabrics. Further, weaving with this product was superior to the polyvinyl alcohol based size as measured by loom efficiency.

EXAMPLE 7

A formulation consisting of 200 pounds of the starch derivative of Example 1 and 10 pounds mill wax, finished at 210 gallons was used to size a 50/1, 65/35 polyester-cotton yarn for a 92×70 (print cloth). Size content was 10.9%.

The comparative conventional size consists of 100 pounds modified pearl starch/70 pounds polyvinyl alcohol and 5 pounds of mill wax, finished at 210 gallons resulting in a 10.4% size content.

In application on a conventional slasher, speed increased from 80 to 95 ypm when the size of the present invention was used. The increase in speed was accompanied by a reduction in dusting at the bust rods. Loom performance was judged to be superior to the starch/polyvinyl alcohol blend based on loom efficiency and loom cleanliness. A reduced tendency for the adjacent warp yarns to cling to each other was also noted.

EXAMPLE 8

A formula consisting of 400 pounds of a cationic, high amylose fluidity made as in Example 1 and 20 lbs. mill wax, finished at approximately 300 gallons was used to size 35/1, polyester-cotton yarn for percale sheeting.

The method of application was dip-dry-dip, utilizing a 4 box slasher whereby the yarns are sized, passed over cylinders for a partial drying, then sized and dried a second time. The starch formulation of the invention resulted in 19.2% size content. In comparison, the conventional sizing resulted in 18% size content of polyvinyl alcohol and mill wax.

Weaving performance superior to the polyvinyl alcohol size was obtained with the size of the invention as determined through loom efficiency and cleanliness and freedom from yarn clinging.

EXAMPLE 9

This example demonstrates the need for high amylose starch in the warp sizes of the present invention.

A formula consisting of 500 pounds of Cato 75 (a cationic corn starch of 28% amylose content having water fluidity of 75 and nitrogen content of 0.26) and 25 pounds of mill wax, was finished at 265 gallons and applied to 15/1, 65/35 polyester-cotton yarn for a size content of 15.5%. This was compared to a size consisting of 300 pounds polyvinyl alcohol, 63 pounds acrylic binder and 15 pounds mill wax, finished at 315 gallons, resulting in a binder content of 11.6%.

Although the corn starch sample had a low viscosity (high water fluidity) and moderate cationic charge, the weaving performance was found to be inferior to even the conventional polyvinyl alcohol size, based on loom efficiency and cleanliness. Many yarns sized with the cationic corn starch were observed to be clinging to adjacent warp yarns.

|  | Loom Efficiency | Warp Stops Per 100,000 Picks - Comments |
|---|---|---|
| Cationic Corn (Cato 75) | 72.0% | 14.7 Not Acceptable |
| Polyvinyl Alcohol Size | 87.4% | 1.2 Acceptable |

EXAMPLE 10

This example shows the necessity for the acid conversion of the high amylose starch. Three high amylose starches were cooked in a laboratory kettle cooker and the viscosity measured initially, and, then, after 1 hour.

| Product | WF/% Nitrogen, D.B. | Loss In Viscosity On Holding 1 Hour at 190° F. |
|---|---|---|
| A | 76/0.864 | Nil |
| B | 40/0.48 | 51% |
| C | 40/0.45 | 41% |

The product of this invention, A, shows essentially no change in viscosity during storage and application. Moreover, when tested as sizes, the starches having lower water fluidity values failed to provide uniform binder application and distribution due to these changes in viscosity.

EXAMPLE 11

This example further illustrates the viscosity stability of the converted, cationic, high amylose derivative of this invention.

A sample, A, was made according to Example 1 except that 10% DEC was used instead of 12%. The final product had a water fluidity (WF) viscosity of 73. A second sample, B, was prepared by reacting high amylose starch with 10% DEC. In this latter case, the acid conversion step was eliminated. The viscosity stability for both of these samples was determined by taking viscosity measurements as in Example 4 with mechanical stirring for the entire time. The viscosity results are recorded in the following table.

| Sample | % Nitrogen (d.b.) | Viscosity Stability | |
|---|---|---|---|
|  |  | % Solids | % Breakdown |
| A | 0.672 | 25 | 8.5 |
| B | 0.783 | 12 | 55.6 |

The results show the converted, cationic, high amylose product shows much more stability.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A warp sizing composition comprising 100 parts water; 3–50 parts of a cationic starch derivative comprising a high amylose starch containing more than 50% amylose, having a water fluidity viscosity within the range of 65 to 80 and a nitrogen content of 0.5 to 0.9% (dry basis); and 0.5–10% by weight of the cationic starch derivative of a softener.

2. The warp sizing composition of claim 1 wherein the nitrogen content is achieved by treating the high amylose starch with a reagent seleced from the group consisting of ethylene imine; propylene imine; b-diethylaminoethyl chloride; b-methylaminoisopropyl chloride; b-dimethylaminoethyl chloride; 3-diethylamino-1,2 epoxypropane; 3-dibutylamino-1,2-epoxypropane; 2-bromo-5-diethylaminopentane hydrobromide; N-(2,3-epoxypropyl)-piperidine; and N,N-(2,3-epoxypropyl)-methyl aniline.

3. The warp sizing composition of claim 1 wherein the nitrogen content is achieved by treating the high amylose starch with diethylaminoethyl chloride.

4. The warp sizing composition of claim 1 wherein the high amylose starch is converted to the water fluidity range using an oxidation or acid conversion treatment.

5. A process for the warp sizing of textile yarns comprising passing the yarns through the sizing solution of claim 1.

* * * * *